United States Patent [19]

Trakas

[11] Patent Number: 4,988,848
[45] Date of Patent: Jan. 29, 1991

[54] CERAMIC HEATER ELEMENT FOR DUAL ZONE SPRUE BUSHING

[76] Inventor: Panos Trakas, 21 W. Wrightwood, Glendale Heights, Ill. 60139

[21] Appl. No.: 428,968

[22] Filed: Oct. 30, 1989

Related U.S. Application Data

[62] Division of Ser. No. 393,476, Aug. 14, 1989, Pat. No. 4,899,435, which is a division of Ser. No. 250,769, Sep. 28, 1988, Pat. No. 4,882,469.

[51] Int. Cl.⁵ .......................... B29C 45/00; H05B 1/00
[52] U.S. Cl. .................................................... 219/421
[58] Field of Search ............... 219/421, 422, 424, 425, 219/426

[56] References Cited

U.S. PATENT DOCUMENTS 4,721,847 1/1988 Leverenz ............................ 219/421

Primary Examiner—Roy N. Envall, Jr.
Attorney, Agent, or Firm—Lockwood, Alex, FitzGibbon & Cummings

[57] ABSTRACT

A sprue bushing which eliminates melt leakage and a method of making the same are described. A cylindrical bushing body having a first, preselected uniform diameter has an annular cavity formed therein which axially extends within the bushing body for a predetermined length and which separates the bushing inner core from the bushing body. A heating element in the form of a ceramic insulator sleeve is inserted into the annular cavity and a particulate refractory material is deposited into the annular cavity to fill the remainder of the annular cavity. When filled, the bushing body is swaged down to a second preselected uniform diameter to compact the powdered refractory together with the preformed sleeve to form a solid heating element. A runner passage is then drilled through the inner core so that the inner core is integral with the bushing casing.

5 Claims, 2 Drawing Sheets

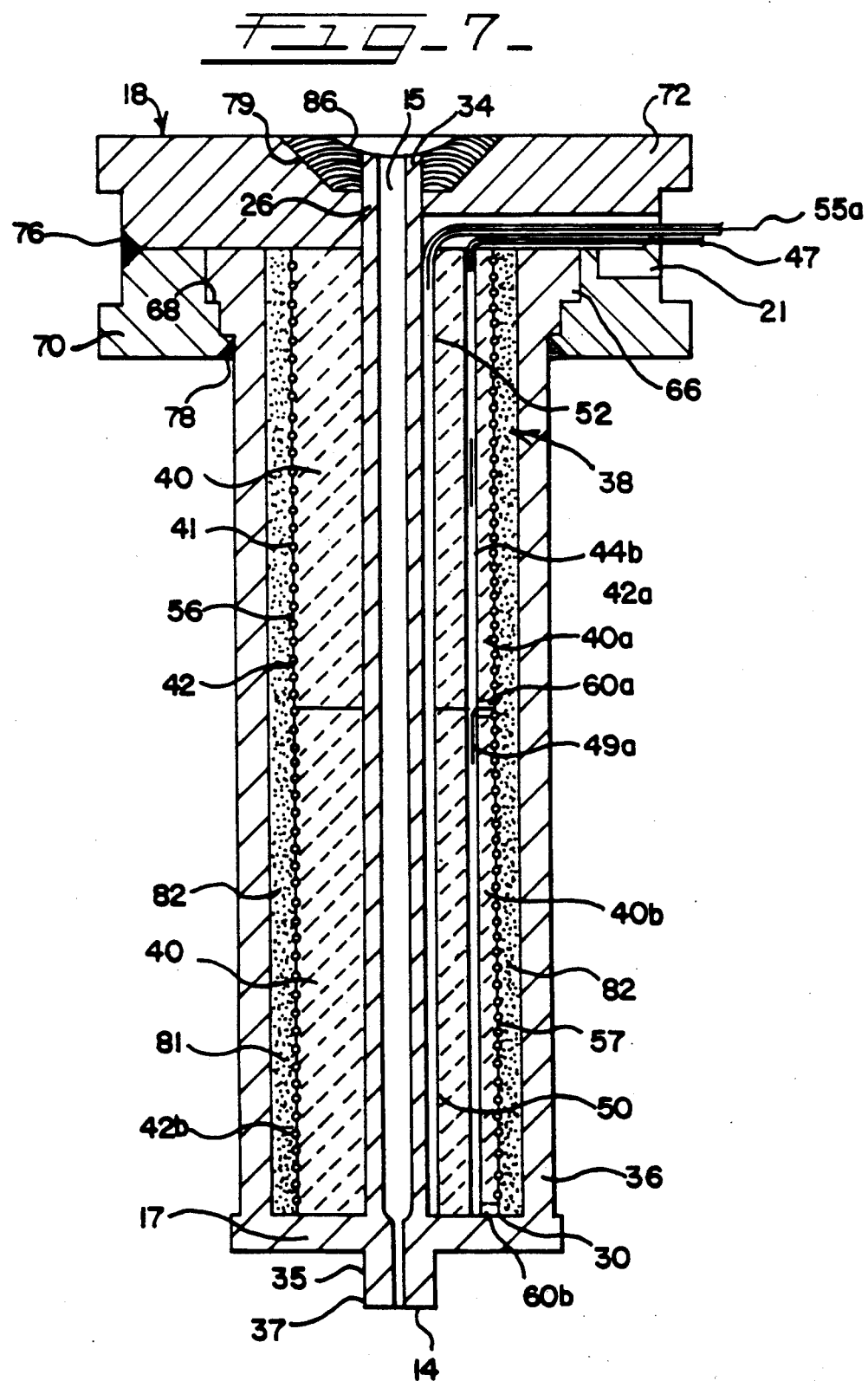

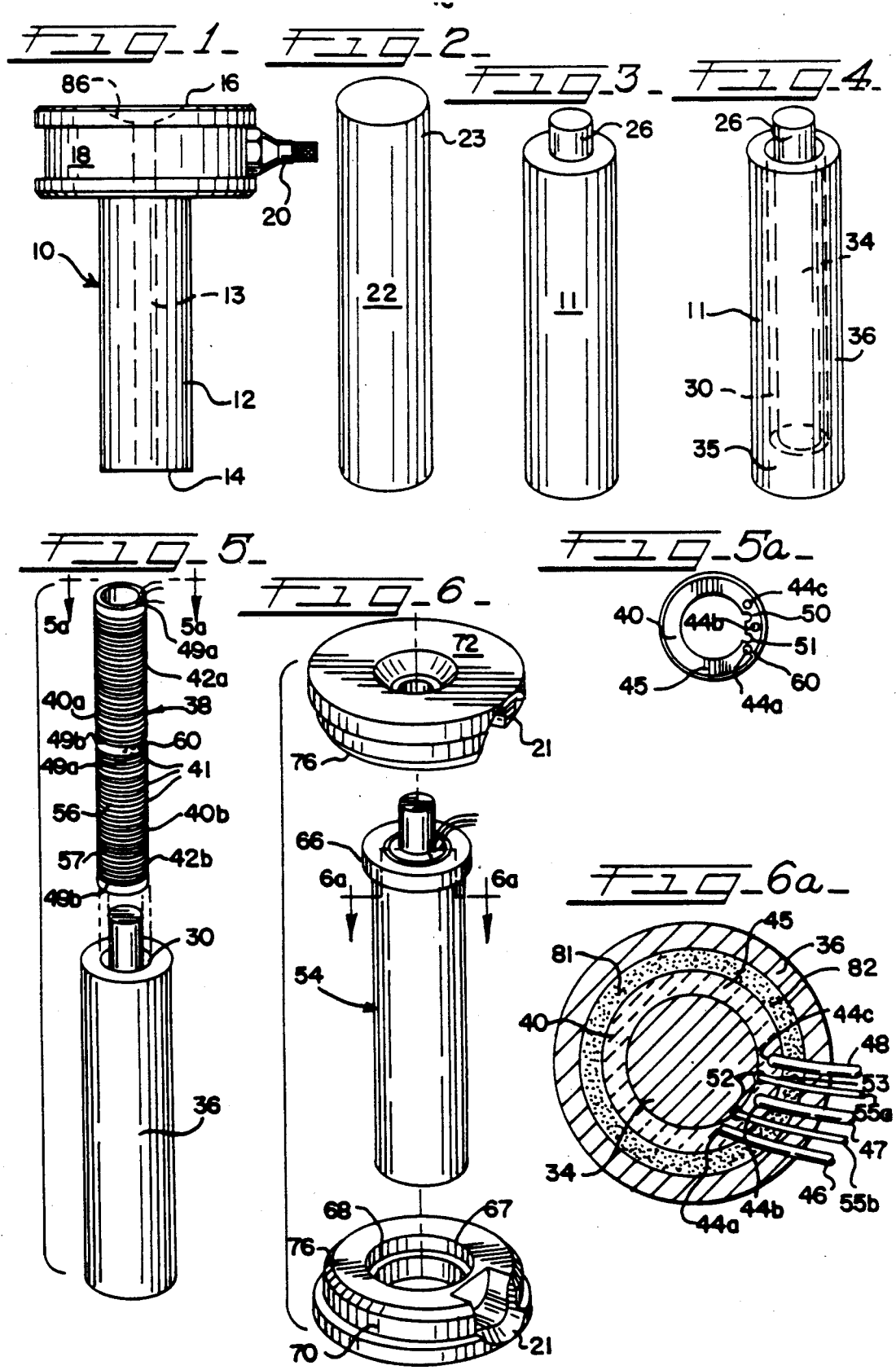

CERAMIC HEATER ELEMENT FOR DUAL ZONE SPRUE BUSHING

This is a Divisional Application, of prior application Ser. No. 393,476, filed Aug. 14, 1989, which is a division application of prior application Ser. No. 250,769, filed Sept. 28, 1988 now U.S. Pat. No. 4,882,469.

BACKGROUND AND SUMMARY OF THE INVENTION

This invention relates generally to sprue bushings for injection molding machines and, more particularly, to internally-heated sprue bushings in which the sprue bushing casing and bushing core are integral and to the method of making such sprue bushings. In this regard, an important aspect of the present invention is directed to an internally heated bushing assembly which is especially suited to handle pressurized melt, which assembly includes a unitary bushing casing-core element having an integral outer side wall, end wall and elongate inner core having a melt running passage therethrough.

Sprue bushings are commonly used in injection molding to provide a heated flowpath for conveying molten plastic or melt between an injection molding machine manifold or nozzle and an injection mold cavity opening. Typically, these sprue bushings include a separate bushing casing portion which may house a heating element and a separate bushing core portion through which the melt flows. The bushing core is usually disposed in the center of the bushing casing and extends axially through the casing between the bushing inlet and an outlet end thereof with one end of the core projecting through a hole in the casing. Since the core and casing are separate, however, the core must be welded to or press fit to the bushing casing at the bushing outlet end.

A serious problem presented by this type of sprue bushing construction arises from a failure at the junction of the discharge end of the inner core and the outlet end of the bushing casing. These sprue bushings are prone to such failure, even when the discharge end of the core is welded to the bushing, since the junction therebetween is subjected to high shear stress induced by the injection and nozzle seating pressures. In particular, when such failure occurs, the high injection molding and nozzle seating pressures encountered by these sprue bushings in operation results in the melt being forced into the heater element causing a shorting between the heating element wires. As a consequence of this shorting, premature burnout of the heater element results, necessitating replacement of the sprue bushing.

The present invention avoids the above-mentioned shortcomings and is directed to a novel sprue bushing assembly in which the bushing casing and core are integral, being formed from a one piece metal blank. As such, these sprue bushing assemblies are characterized by a unique bushing casing-core element which includes an integral outer side wall, end wall and elongate inner core having a melt runner passage extending therethrough. In this manner, failure at the junction of the discharge end of the inner core and the outlet end of the bushing casing is avoided, thereby eliminating melt leakage and internal heating element contamination.

In a sprue bushing assembly incorporating the principles of the present invention, a single cylindrical metal blank is provided with an annular cavity axially extending within the blank to form an elongate inner core member which is spaced apart from the outer wall, or casing, of the bushing and which inner core axially extends through the cavity. The annular cavity contains at least one heating element in the form of a hollow preformed ceramic electrically non-conductive sleeve which encircles the inner core. Open spaces in the annular cavity between the heating sleeve, the bushing casing and core are filled with a powdered or particulate refractory material to form a heater-bushing blank assembly. When filled, the heater-bushing blank assembly is then swaged and reduced down to a preselected uniform diameter, thereby compressing the refractory material and preformed heating element into a unified mass which fills the annular cavity and which is free of all air voids. A head member containing conduction and temperature sensing wires to the heating element is then added to the top portion of the bushing-heater assembly and the cap then firmly welded to the bushing assembly. An opening is drilled through the bushing core to provide a melt flowpath. The outlet end of the bushing is then finished to form a final bushing outlet tip.

Accordingly, it is a general object of the present invention to provide a method of manufacturing an improved sprue bushing from a single metal blank wherein the inner core is integral with the bushing casing which eliminates melt leakage and heater element burnout.

Another object of the present invention is to provide an injection molding unitary sprue bushing in which the bushing core is integral with the bushing casing and which has a multi-stage heating element for supplying heat to different areas of the bushing core.

A further object of the present invention is to provide a unitary sprue bushing wherein the bushing includes an outer annular casing, an inner core axially extending through the bushing casing, a bushing outlet that is integral with the bushing casing and inner core, and an annular cavity encircling the inner core and separating the bushing casing from the inner core which cavity contains at least one performed non-electrically conductive sleeve.

A yet further object of the present invention is to provide a sprue bushing in which the inner core is integral with the bushing casing and in which the bushing heating element has at least one thermowell formed therein which is adapted to receive a removable thermocouple.

Another object of the present invention to provide a unitary sprue bushing having an inner core which is integral with the bushing casing, wherein the inner core and casing are separated by an annular cavity adapted to receive a heating element therein which encircles the inner core and fills a portion of the annular cavity, the remainder of the cavity being filled by a particulate refractory material.

A still another object of the present invention is to provide a sprue bushing for injection molding having an outer bushing casing, an inner core integral with the bushing casing and axially extending therethrough, the inner core having a melt runner passage axially extending through the bushing, the bushing further including an annular cavity disposed between the inner core and bushing casing, the cavity having two heating element means in the form of preformed sleeves axially aligned therein, each heating element means providing heat to a different portion of the inner core of the sprue bushing.

These and other objects, features and advantages of the present invention will be apparent from the follow-

BRIEF DESCRIPTION OF THE DRAWINGS

In the course of this description, reference will be made to the attached drawings in which:

FIG. 1 is an elevational view of a sprue bushing constructed in accordance with the principles of the present invention;

FIG. 2 is a perspective view of a metal blank from which the bushing of FIG. 1 is formed;

FIG. 3 is a perspective view of the bushing blank of FIG. 2 showing the formation of a stem on the inner core;

FIG. 4 is a perspective view of the bushing blank showing the location and extent of the annular cavity in the blank;

FIG. 5 is an exploded perspective view of the bushing blank showing how the heater elements are assembled into the cavity;

FIG. 5a is a plan view of the heater element of FIG. 5 taken along lines 5a—5a;

FIG. 6 is an exploded perspective view showing how the bushing cap portions are assembled onto the bushing-heater assembly;

FIG. 6a is a sectional view of the bushing of FIG. 5 taken along lines 6a—6a; and FIG. 7 is a sectional view of a completed sprue bushing.

DETAILED DESCRIPTION OF THE PREFERRED EMBODIMENT

Referring to the drawings and in particular to the FIGS. 1-7, a sprue bushing 10, constructed in accordance with the principles of the present invention is shown as having an elongate bushing body 12 extending between the bushing outlet end 14 and the bushing inlet end 16. An enlarged end cap 18 is located at the bushing inlet end and houses a shielded electrical cable 20 located in a connection cavity 21 and extends outwardly from the cap 18. The cable 20 contains the necessary electrical wires which lead to an external source of power (not shown) which energizes the bushing and monitors the temperature of the bushing.

The first step in making the bushing 10 is forming a metal blank 22 into an elongate cylinder having a preselected, uniform diameter such as by machining, casting or electric discharge machining ("EDM"). The top portion 23 of the blank 22 is machined to form an initial bushing body 11 which has an elongate stem 26 centrally disposed in the body 11 and axially extending therefrom. The stem 26 defines the initial outer diameter of the bushing inner core 34. In the illustrated embodiment, the stem 26 is shown as protruding past the end of the bushing body 11. Alternatively, if desired, the stem 26 may be formed at a later stage by removing a portion of the bushing outer sidewall 36.

In accordance with an important aspect of the present invention, the initial bushing body 11 is then machined to form an elongate annular cavity 30 which defines an inner core 34 and separates it from the bushing casing or outer sidewall 36. The annular cavity 30 extends substantially the entire length of the bushing body 11, and terminates near the outlet end 14, leaving a bushing end wall 17 which is integral with the bushing outer sidewall 36 and the elongate inner core 34. Preferably, an excess body end or bushing outlet portion 35 is left on the bushing body 11 near the end wall 17 so that the bushing tip 37 can be machined to a desired configuration as shown. The annular cavity 30 is dimensioned in width to loosely receive heating means 38 in the form of one or more preformed hollow non-electrically conductive, ceramic insulator sleeves 40 wound with resistance wire 42 to form an electrical heating coil 57 extending along the length of the insulator sleeve 40. Each sleeve 40 encircles the inner core 34.

FIGS. 5 and 6 illustrate a multi-stage heater bushing assembly constructed in accordance with the principles of the present invention which has a first preformed heating element insulator sleeve 40a which forms the first stage heater of the sprue bushing and a second preformed heating element insulator sleeve 40b which forms the second stage heater of the sprue bushing. The first and second insulator sleeves are axially aligned in the annular cavity 30 with each other. The inner diameter of each preformed insulator sleeve 40a, 40b is slightly greater than the outer diameter of the inner core 34, while the sleeve outer diameter is substantially less than the inner diameter of cavity 30. The sleeve clearance with the bushing casing forms an annular space 81 which surrounds the outer diameter of the heating element sleeves 40a, 40b. A particulate ceramic refractory material 82 such as powdered magnesium oxide, which facilitates the transfer of heat between the heating element and the inner core and insulates the heating coil 57 from contact with the metal bushing inner core and casing is deposited into the annular space 81 to form a bushing-heater assembly 54. Magnesium oxide is a particularly suitable ceramic refractory material since, when fully compacted, it has excellent heat transfer capabilities and good dielectric strength at high temperatures. The powdered refractory is preferably finely ground so that it completely fills most of the initial air voids caused by pouring the refractory into the annular space 81. Any remaining air voids in the refractory material are removed when the bushing-heater assembly 54 is swaged down to a second preselected diameter as explained in greater detail below. Due to manufacturing tolerances, an occasional small gap may appear between the inner diameter of the insulating sleeves 40a, 40b and the outer diameter of the bushing inner core 34. This gap is also filled with the refractory material 82.

Turning to FIGS. 5 and 6 which illustrate the details of the unique dual zone heating element aspect of the present invention, the outside periphery of sleeves 40a, 40b is wound with a predetermined length of resistance wire 42, such as nichrome wire, to form an electrical heating coil 57 extending along the length of the sleeves 40a, 40b. The heating coil 57 includes a plurality of circumferential turns 41 having a predetermined axial spacing 56 between adjacent turns. The opposite ends 49a, 49b of the resistance wire 42 engage the electrical conducting leads 46, 47, 48 of power wires that extend through the sleeves 40a, 40b in the manner described below and up through the bushing cap 18 and out through the connection recess 21 via cable 20 to an external source of power. The ends 49a, 49b of the resistance wire are inserted into sleeve conduit means in the form of three aligned axial passages 44a, 44b, 44c which are present in the sleeve wall 45 and which axially extend through the heating element insulator sleeves 40a, 40b.

In accordance with one aspect of the present invention, the conducting leads 46, 47, 48 and the heating coil resistance wire ends 49a, 49b engage each other in electrical engagement relationship in the sleeve passages 44a, 44b and 44c to form an electrical connection for energizing the resistance wires. Opposite ends 49a, 49b of the resistance wires are inserted into one of the three passages on each sleeve end to contact the conducting leads 46-48, as explained in detail below. In order to prevent the resistance wire ends from contacting any metal portion of the bushing, the opposite ends of sleeves 40a, 40b contain radial recesses 60, indicated as 60a, 60b in FIG. 7, to convey the resistance wire ends into the preselected sleeve passage.

After the second stage sleeve 40b is wound with resistance wire 42, the bottom wire end 49b is inserted into one sleeve passage shown as first passage 44a. The opposite or top resistance wire end 49a is inserted into a second passage distinct from the first passage, shown as center passage 44b. A similar winding arrangement is used with the top or first stage sleeve 40a. The bottom wire end 49b of the resistance wire 42 used on the first stage sleeve 40a is inserted in the remaining, or third passage 44c and the top opposite wire end 49a is inserted in the center passage 44b. The wound sleeves 40a, 40b are then aligned such that the three passages 44a, 44b and 44c of each heater stage are also axially aligned. Electrical conducting means in the form of conducting leads 46, 47 and 48 are inserted into passages 44a, 44b and 44c, respectively to engage the resistance wire ends present in the sleeve passages. First lead 46 passes through the first stage first passage 44a and does not engage any first stage resistance wire therein and thus is the energizing lead to the heater second stage 40b. It continues well into the second sleeve first passage 44a until it engages the bottom resistance wire end 49b to establish a current conducting relationship therebetween. The second stage heater circuit is completed by the insertion of second conducting lead 47 into the second, center passages 44b of the first and second stages so that it completely extends through first stage 40a and engages the opposite wire length 49a of the second stage resistance wire.

In extending through the first stage center passage 44b of the first sleeve 40a, the center conducting lead engages the upper end 49a of first stage resistance wire 42a. The third and final conducting lead 48 is the energizing lead for the first heater stage 40a and is inserted into the first stage third passage 44c to complete the first stage sleeve heating circuit. All three of the conducting leads extend sufficiently out of the sleeve openings at the top of the bushing for connection to a cable 20 which leads to an external power source. It will be appreciated that this unique wiring arrangement allows the operator to supply power independently to the first and second or both, heating sleeves, with the use of only one control cable to the sprue bushing.

The heating element assembly is completed by the insertion of thermowell means 53 in the form of two predetermined lengths of metal tubing 52 which are disposed in sleeve axial slots 50 and 51 adjacent the inner core 34. A first thermocouple lead 55a is inserted into the thermowell 53 in the first axial slot 50 and extends substantially the entire length of both sleeves 40a and 40b. This thermocouple 55a primarily monitors the heat applied to the inner core 34 by the second stage heating element 40b. The remaining thermocouple lead 55b is inserted into the thermowell 53 disposed in the second axial slot 51. It extends approximately one-half of the entire length of first heating element sleeve 40a and therefore it monitors the heat applied to the inner core 34 by the first stage heating element 40a. Both thermowells 53 become firmly embedded in the annular cavity 30 as a result of the swaging process (explained below) and thus, if a thermocouple should fail in operation, it can be removed and replaced at the bushing end cap 18 and the sprue bushing need not be discarded. With the use of two thermocouple 55a and 55b, it is possible to monitor the heat being applied to the bushing inner core 34 by the separate stage heating elements.

Importantly, after the annular cavity 30 has been filled with the preformed sleeves 40a, 40b and the powdered refractory 82, the entire filled bushing-heater assembly 54 is then swaged in a conventional manner to compress the refractory 82 around the heating element insulator sleeve 40 to form a unified mass in the annular cavity 30. The swaging also reduces the bushing heater assembly to a second, uniform preselected diameter. The pressure exerted on the bushing-heater assembly during swaging forces the powdered refractory 82 into the annular space 81 surrounding the preformed insulator sleeve 40, eliminates any air voids in the refractory and maintains the spacing 56 between adjacent resistance wires. This compaction ensures that the resistance wires 42 are maintained in their positions as wound on the insulator sleeves 40a, 40b. The swaging also compacts the magnesium oxide refractory 82 to a preferred density which is desired for excellent heat transfer.

After the bushing body 11 has been swaged, the top of the bushing assembly 54 can be further machined to provide radially extending flanges 66 which abut complementary shoulders 68 located in the bushing bottom half 70 of the bushing end cap 18. As previously noted, the stem 26 if not previously formed, may be formed at this time when the radially extending flanges 66 are machined. The end cap bottom 70 has an opening 67 to accommodate the final diameter of the bushing assembly and slides over the bushing body 11 to engage the bushing flanges 66. The top half 72 of end cap 18 slides over the bushing stem 26 to complete the formation of bushing end cap 18. The top and bottom end cap halves each have similar cable connection recesses 21 located therein to accommodate the insertion of a shielded cable connection 20 therein. After the halves are assembled onto the bushing body 11, they are joined together, as by welding, where they meet at an exterior chamfer 76 around the entire periphery of the head cap 18. The bottom half 70 of end cap 18 may be welded to the bushing body 11, at a chamfer 78 which extends around the periphery of the bottom end cap opening 67. A final weld 79 joins the end cap top half to the inner core 34 where the top cap 72 meets the inner core 34. (FIG. 7). The runner passage 13 is then drilled through the center of the inner core 34 to provide a melt flowpath 15 which extends through the sprue bushing body 12 from the inlet end 16 to the outlet end 14. After the runner passage 13 is drilled, the top of the end cap 18 may be machined to provide a well 86 to receive the injection molding machine nozzle or manifold outlet.

Alternatively, the bottom half 70 of the end cap 18 can be formed integrally with the bushing body 12, if the bushing body 12 is chosen from stock having a suitable outer diameter.

Finally, the outlet end of the sprue bushing body 12 is finished by machining to remove the excess end portion 35 to form the desired type of tip 37.

It will be appreciated that the embodiment of the present invention which has been discussed is merely illustrative of one of the applications of this invention and that numerous modifications may be made by those skilled in the art without departing from the true spirit and scope of this invention.

I claim:

1. A ceramic heater element intended for use in a sprue bushing having an internally heated melt passageway which axially extends through an elongated inner core of the sprue bushing, the elongated inner core extending between an inlet end and outlet end thereof, said sprue bushing having a dual zone heating means disposed in an annular compartment axially extending between the elongated inner core and an exterior sidewall of an outer casing of said sprue bushing, said ceramic heater element comprising a hollow sleeve having a predetermined axial length, the hollow sleeve containing three passages axially extending therethrough and circumferentially spaced apart within said hollow sleeve, the passages being adapted to receive therein a preselected length of resistance wire said hollow sleeve further including two axial slots extending the length of said sleeve, the axial slots being disposed on an inner surface of said hollow sleeve, each of said slots being adapted to slidingly receive a thermowell therein, such that the thermowell is held by said hollow sleeve against said sprue bushing elongated inner core.

2. The ceramic heater element of claim 1, wherein said hollow sleeve includes a plurality of turns of resistance wire circumferentially wound about the outer periphery of said hollow sleeve, the plurality of turns of resistance wire being axially spaced apart along the length of said hollow sleeve, said hollow sleeve further including two openings radially extending through said hollow sleeve at opposite ends thereof, one end of said resistance wire axially extending through one of the hollow sleeve radial openings and the other end of said resistance wire axially extending through the outer of said hollow sleeve radial openings.

3. The ceramic heater element of claim 1, wherein said hollow sleeve has an inner diameter greater than the outer diameter of said sprue bushing elongated inner core and said hollow sleeve further has an outer diameter less than the inner diameter of said sprue bushing annular compartment whereby said ceramic heater element is slidingly received in said sprue bushing annular compartment over said elongated inner core.

4. The ceramic heater element of claim 1, wherein the one end of said resistance wire is further disposed in a first passage of said three passages and said other end of said resistance wire is further disposed in a second passage of said three passages.

5. A ceramic heater element intended for use in a sprue bushing having an internally heated melt passageway which axially extends through an elongated inner core of the sprue bushing between an inlet end and outlet end thereof, said sprue bushing having a dual zone heating means disposed in an annular compartment axially extending between the elongated inner core and an exterior sidewall of an outer casing of said sprue bushing, said ceramic heater element comprising:

a hollow sleeve having a predetermined axial length and a sidewall having a predetermined wall thickness, the hollow sleeve containing three passages axially extending through the sidewall thereof, the three passages being circumferentially spaced apart within said sidewall, each of the passages being adapted to receive therein a preselected length of resistance wire, said hollow sleeve further including two axial slots extending along an inner surface of said sleeve sidewall for the entire length of said hollow sleeve, said two axial slots occupying only a portion of said sleeve sidewall thickness, each of said two axial slots being adapted to slidingly receive a thermowell therein whereby the thermowell is held by said hollow sleeve against said sprue bushing elongated inner core, said hollow sleeve further including a length of resistance wire circumferentially wound about the outer periphery of said hollow sleeve so as to form a plurality of circumferential turns of resistance wire, said resistance wire turns being axially spaced apart along the length of said hollow sleeve, said hollow sleeve further including two openings radially extending through said hollow sleeve at opposite ends thereof, one end of said resistance wire axially extending through one of said hollow sleeve radial openings and the other end of said resistance wire axially extending through the outer of said hollow sleeve radial openings.

* * * * *